US012625844B2

(12) United States Patent
Wang et al.

(10) Patent No.: US 12,625,844 B2
(45) Date of Patent: May 12, 2026

(54) FILE MANAGEMENT METHOD AND APPARATUS, DEVICE, AND SYSTEM

(71) Applicant: Huawei Technologies Co., Ltd., Shenzhen (CN)

(72) Inventors: Yibin Wang, Beijing (CN); Lingchuan Sun, Shenzhen (CN); Xinxiang Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 18/534,172

(22) Filed: Dec. 8, 2023

(65) Prior Publication Data

US 2024/0111713 A1 Apr. 4, 2024

Related U.S. Application Data

(63) Continuation of application No. PCT/CN2022/097925, filed on Jun. 9, 2022.

(30) Foreign Application Priority Data

Jun. 10, 2021 (CN) .......................... 202110649924.4

(51) Int. Cl.
*G06F 16/11* (2019.01)
*G06F 16/182* (2019.01)

(52) U.S. Cl.
CPC .......... *G06F 16/125* (2019.01); *G06F 16/182* (2019.01)

(58) Field of Classification Search
CPC ...... G06F 16/93; G06F 40/30; G06F 21/6218; G06F 16/125; G06F 16/182
USPC ......................................................... 707/694
See application file for complete search history.

(56) References Cited

U.S. PATENT DOCUMENTS

| | | | | |
|---|---|---|---|---|
| 9,423,970 B2 * | 8/2016 | Darragh | ............ | G11C 16/3445 |
| 2016/0124462 A1 * | 5/2016 | Sikdar | .................. | G06F 3/0631 |
| | | | | 710/303 |
| 2016/0352778 A1 * | 12/2016 | Chari | ..................... | G06N 20/00 |
| 2017/0033806 A1 * | 2/2017 | Arslan | ................. | G06F 3/0616 |
| 2020/0311035 A1 * | 10/2020 | Chung | ................. | G06F 16/182 |
| 2020/0326876 A1 * | 10/2020 | Tian | ...................... | G06F 3/0653 |

FOREIGN PATENT DOCUMENTS

CN        112306411 A        2/2021

* cited by examiner

*Primary Examiner* — Hung T Vy
(74) *Attorney, Agent, or Firm* — Conley Rose, P.C.

(57) ABSTRACT

A file management method includes obtaining a storage path of a file; obtaining an attribute of the file through calculation based on the storage path and an attribute prediction model; and determining a storage policy for the file based on the attribute.

20 Claims, 6 Drawing Sheets

FILE MANAGEMENT METHOD AND APPARATUS, DEVICE, AND SYSTEM

CROSS-REFERENCE TO RELATED APPLICATIONS

This is a continuation of International Patent Application No. PCT/CN2022/097925 filed on Jun. 9, 2022, which claims priority to Chinese Patent Application No. 202110649924.4 filed on Jun. 10, 2021, both of which are hereby incorporated by reference in their entireties.

TECHNICAL FIELD

This disclosure relates to the field of computer technologies, and in particular, to a file management method, a device, and a system.

BACKGROUND

With an explosive growth of data in recent years, intelligent file management becomes one of mainstream modes in the future. Importance of different files can be measured based on value of file information, and important files require a faster access speed and a stricter storage policy. A current mainstream distributed file system mainly relies on querying metadata information of a file to measure value of the file, so that a storage method and a storage area that are of the file are measured. However, during distributed storage of large-scale files, accessing metadata information of each file is a quite time-consuming process. In addition, for a same file on different nodes, because both a quantity of accesses and access requirements in a period of time are different, value of the file also varies with time and node. Consequently, when an original file is uploaded to a distributed system, or migrated from one distributed system to another distributed system, great time consumption is caused, which severely affects storage performance of the distributed file system. Therefore, how to provide a method for efficiently perceiving value of a file and improving a file storage speed and performance in the distributed file system becomes a technical problem to be urgently resolved.

SUMMARY

This disclosure provides a file management method, a device, and a system, to provide a method for efficiently detecting a size and a life cycle that are of a file and recommending a storage policy for the file, which improves a file storage speed and performance in a distributed file system.

According to a first aspect, a file management method is provided, where the method includes obtaining a storage path of a file, obtaining an attribute of the file through calculation based on the storage path and an attribute prediction model, and determining a storage policy for the file based on the attribute. According to the foregoing method, the storage path of the file may be used for predicting the attribute of the file, to obtain the storage policy for the file. This reduces a quantity of accesses to metadata of the file, and improves a speed of storing and reading the file.

In a possible implementation, before obtaining an attribute of the file through calculation, the method further includes obtaining attribute data and a file path that are of a stored file, and using the attribute data and the file path to train an initial model to obtain the attribute prediction model. According to the foregoing method, the trained attribute prediction model may be used for predicting the attribute of the file, which improves precision of prediction.

In another possible implementation, the managed file is a newly created file, the attribute is a size of the file, and the storage policy for the file is a quantity of strips used when data of the file is stored. According to the foregoing method, the storage path of the file may be used for predicting the size of the file, and obtaining a layout policy during file storage. This reduces the quantity of accesses to the metadata of the file, and improves the speed of storing the file.

In another possible implementation, the managed file is a client file, the attribute is a life cycle value of the file, and the storage policy for the file is a storage medium used when data of the file is stored. According to the foregoing method, the storage path of the file may be used for predicting the life cycle value of the file, and obtaining the storage medium during file storage. This reduces the quantity of accesses to the metadata of the file, and improves the speed and performance of when a client reads the file.

In another possible implementation, a method for determining the storage medium used when the data of the file is stored includes obtaining a first storage medium in which the file is currently stored, and obtaining storage duration of the file in the first storage medium. When the storage duration does not exceed a first duration threshold, the first storage medium is still used for storage. When the storage duration exceeds the first duration threshold, a second storage medium is used for storage, and a read speed of the second storage medium is less than a read speed of the first storage medium. According to the foregoing method, a file whose storage duration exceeds a predicted life cycle value of the file may be stored in a storage medium with a low read speed, so that limited resources are preferentially used for satisfying a frequently used file.

According to a second aspect, this disclosure provides a file management apparatus. The file management apparatus may be a software apparatus or a hardware apparatus located on a client or another device, or may be an independent device. The file management apparatus includes modules configured to perform the file management method according to the first aspect or any one of possible implementations of the first aspect.

According to a third aspect, this disclosure provides a device, where the device includes a processor and a memory. The memory is configured to store an attribute prediction model and computer-executable instructions. The processor is configured to execute the computer-executable instructions in the memory, to enable the device to perform the operation steps of the file management method according to the first aspect or any one of possible implementations of the first aspect.

According to a fourth aspect, this disclosure provides a file management system, where the system includes a file management unit and a client. The file management unit may be an independent device, or may be a software apparatus or a hardware apparatus located on a device. The file management apparatus and the client are jointly configured to implement the operation steps of the file management method according to the first aspect or any one of possible implementations of the first aspect.

According to a fifth aspect, this disclosure provides a computer-readable storage medium. The computer-readable storage medium stores instructions. When the instructions are run on a computer, the computer is enabled to perform the operation steps of the method according to the first aspect or any one of possible implementations of the first aspect.

According to a sixth aspect, this disclosure provides a computer program product including instructions. When the computer program product runs on a computer, the computer is enabled to perform the operation steps of the method according to the first aspect or any one of possible implementations of the first aspect.

In this disclosure, based on the implementations according to the foregoing aspects, the implementations may be further combined to provide more implementations.

DESCRIPTION OF EMBODIMENTS

The following describes the technical solutions in embodiments of this disclosure with reference to the accompanying drawings. Before a file management method provided in embodiments of this disclosure is described, a system architecture to which embodiments of this disclosure are applicable is described.

Figures 1, 2:
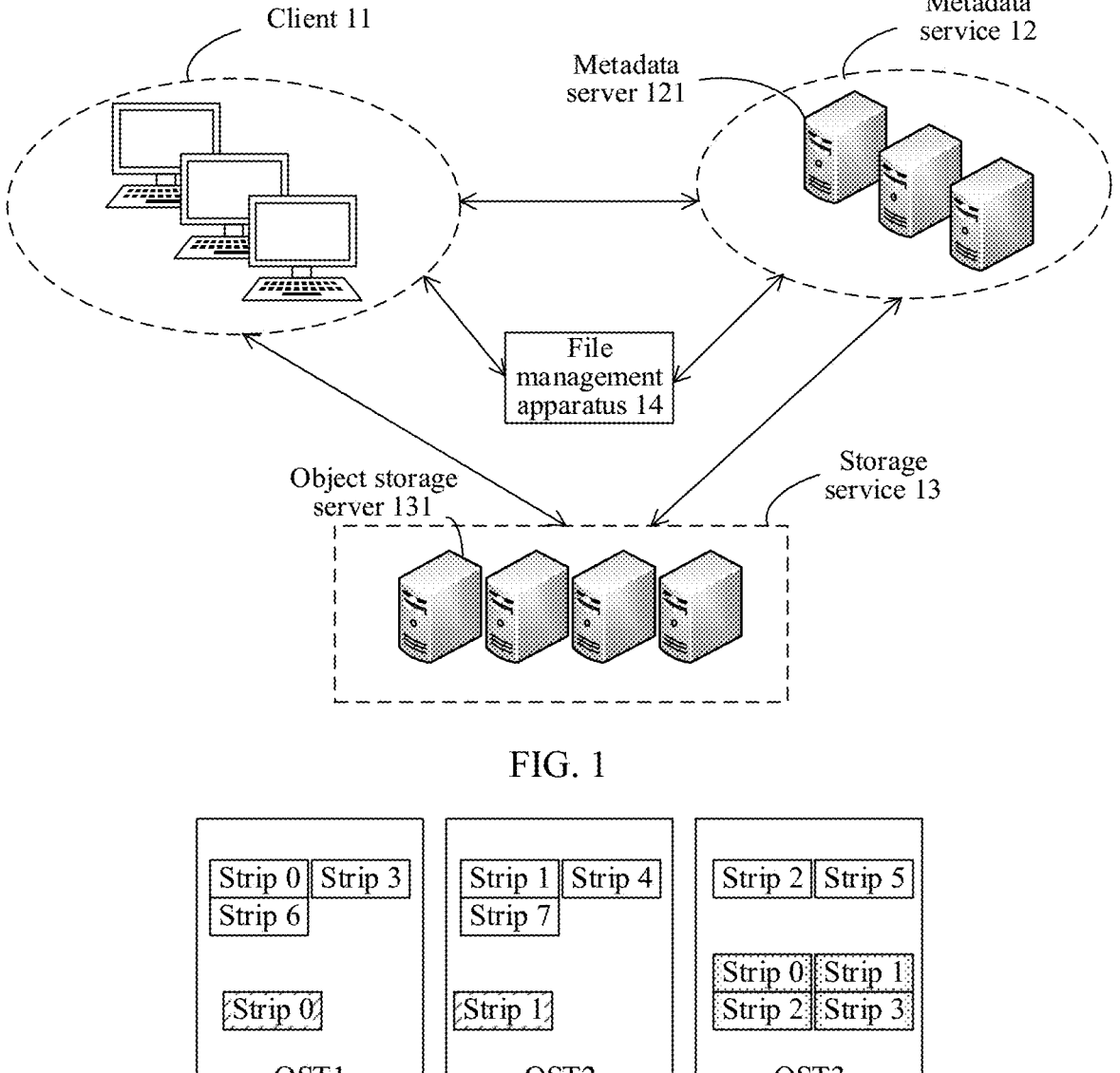
FIG. 1 is a schematic diagram of a storage system according to an embodiment of this disclosure.
FIG. 2 is a schematic diagram of a data layout of a file according to this disclosure.

FIG. 1 is a schematic diagram of a storage system according to an embodiment of this disclosure. The storage system includes a client 11, a metadata service 12, a storage service 13, and a file management apparatus 14. The client, the metadata service, and the storage service may be connected to each other through a link. For example, the link may be a local area network (LAN), a wide area network (WAN), or another type of communication channel. The file management apparatus 14 may be connected to the client 11, or connected to the metadata service 12, or connected to both the client 11 and the metadata service 12 through a similar link. Optionally, the file management apparatus 14 may further be connected to the storage service 13 through the similar link.

The client 11 includes a plurality of devices having a storage function and a calculation function. A user may run software of a distributed file system through the client 11, invoke an interface provided in the software, and store a file in the storage system or read a file stored in the storage system into the client. The client 11 may further provide a visual operation interface of the distributed file system for the user. The client includes at least one memory. When reading the file, the client 11 may retrieve the file from a remote end and store the file in the memory. The memory may be internal storage, where the internal storage includes at least two memories. For example, the internal storage may be a random-access memory (RAM), or may be a read-only memory (ROM). For example, the RAM may be a dynamic RAM (DRAM), or may be a storage class memory (SCM). The internal storage may further include another RAM, for example, a static RAM (SRAM). The ROM, for example, may be a programmable ROM (PROM), an erasable PROM (EPROM), or the like. In addition, the internal storage may alternatively be a dual in-line memory module (DIMM), that is, a module including the DRAM. The memory in embodiments may alternatively be a hard disk. Different from the internal storage, the hard disk has a data read-write speed slower than that of the internal storage. A type of the hard disk may be a solid-state drive (SSD), a hard disk drive (HDD), or another type of hard disk.

The metadata service 12 is configured to manage and store metadata of the file. The metadata service 12 includes one or more metadata servers, for example, a metadata server 121. Data recorded in the metadata includes a file name, a file path, file access permission, file access time, a file data layout, and the like. The metadata may be used for supporting functions such as indicating a storage location, historical data, resource search, and file recording.

Similar to the metadata service 12, the storage service 13 is configured to manage and store data of the file. The storage service 13 includes one or more object storage servers, for example, an object storage server 131. Each object storage server may be logically divided into one or more object storage targets, and the object storage server may store the data of the file in different object storage targets.

A file can be divided into a plurality of data blocks and stored in the different object storage targets, to accelerate a storage and read speed of the file. One of the data blocks may be referred to as a strip, and a manner of striping and storing the file is referred to as a data layout of the file. For a given file, a quantity of distributed object storage targets of the file is a quantity of strips of the file. When the file is created, the quantity of strips and a size of the strip may be configured by the user, or may be automatically configured by the metadata server based on a workload status of each object storage target. In a process of storing the file, the strips are cyclically stored in the object storage targets allocated to the file. When a strip is full of data of the file, a second strip is automatically written into a next object storage target. FIG. 2 is a schematic diagram of a data layout of a file according to this disclosure. As shown in FIG. 2, a file A is stored in three object storage targets, and a quantity of strips is 3, a file B is stored in two object storage targets, and a quantity of strips is 2, and a file C is stored in one object storage target, and a quantity of strips is 1. Based on a size of the strip, the file A may be divided into eight strip blocks, and the eight strip blocks are cyclically stored in allocated object storage targets in sequence. A strip 0 is stored in an object storage target 1, a strip 1 is stored in an object storage target 2, a strip 2 is stored in an object storage target 3, and a strip 3 is re-stored in the object storage target 1. Each object storage target may store one or more strip blocks.

A file management apparatus 14 is configured to perform, in a deep learning method, modeling on a life cycle and a file size that are of a file, to construct a file attribute prediction model. The file management apparatus 14 may further be configured to obtain predicted values of the file size and the life cycle in collaboration with another component of a file management system based on the file attribute prediction model, to implement storage and reading of the file. The life cycle file of the file is used for describing a series of phases that the file goes through in entire life of the file. These phases include creating a document, using and modifying the document until the document is destroyed or permanently archived. The life cycle of the file can well measure use value of the file.

The file management apparatus 14 may be a server, or a server cluster including several servers, or a cloud computing service center. In another embodiment, the file management apparatus 14 may alternatively be a hardware component on a hardware apparatus or a set of software apparatuses running on a hardware apparatus. The hardware apparatus may alternatively be a server, or a server cluster including several servers, or a cloud computing service center. Particularly, when the file management apparatus 14 is the software apparatus, the file management apparatus 14 may be located in the client 11 in FIG. 1.

It should be noted that the system architecture of the storage system shown in FIG. 1 is merely an example used for better describing the system architecture provided in the file management method according to this disclosure, and does not constitute a limitation on embodiments of this disclosure.

Figure 3:
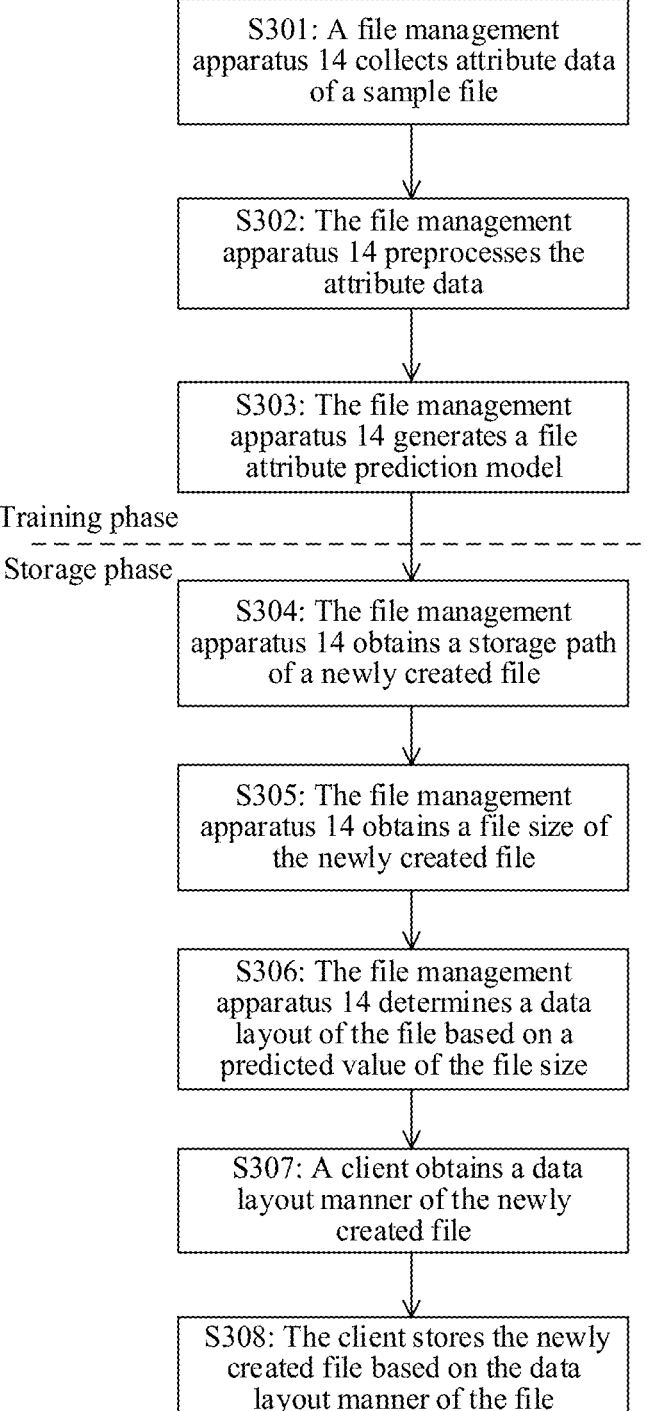
FIG. 3 is a schematic flowchart of a file management method according to this disclosure.

The following describes the file management method provided in embodiments of this disclosure with reference to FIG. 3 to FIG. 6. FIG. 3 is a schematic flowchart of a file management method according to this disclosure. The method may be used for determining a data layout of a newly created file. The method includes two phases: a training phase and a storage phase. As shown in the figure, a specific method includes the following steps.

S301: A file management apparatus 14 collects attribute data of a sample file.

The file management apparatus 14 uses some files that have already existed in a storage node as sample files, reads metadata of these files, filters data of the obtained metadata, and extracts the attribute data related to a life cycle and a size that are of the file. The attribute data includes a file path, a file size, file creation time (btime), latest file access time (atime), latest file content modification time (mtime), and latest file metadata modification time (ctime). The life cycle of the file $F_{life}$ can be obtained based on the file creation time, the latest file access time of, the latest file content modification time, and the latest file metadata modification time, and the life cycle of the file satisfies a formula 1:

$$F_{life} = \log(\max(a\text{time}, c\text{time}, m\text{time}) - b\text{time}) \qquad \text{Formula 1,}$$

where max(atime, ctime, mtime) indicates a largest value of the latest file access time, the latest file content modification time, and the latest file metadata modification time.

S302: The file management apparatus 14 preprocesses the attribute data.

The attribute data of the sample file collected by the file management apparatus 14 may be used for training a file attribute prediction model.

To improve training efficiency and precision, the collected attribute data may be first preprocessed before the training. The preprocessing includes the following three parts.

(1) Standardize the Life Cycle of the File.

Because a change range of time data recorded in the attribute data of the file is from zero to infinity, a large interval may exist between life cycles of two different files, and sample data with a large life cycle value may reduce a training capability of sample data with a small life cycle value. Therefore, a log expression may be used for standardizing a life cycle value, to reduce a difference between life cycle values of different files. A standardized life cycle $F_{normlife}$ satisfies a formula 2:

$$F_{normlife} = \log(\max(a\text{time}, c\text{time}, m\text{time}) - b\text{time}) \qquad \text{Formula 2.}$$

It should be noted that, a unit of the life cycle is not limited in embodiments of this disclosure. For example, in embodiments of this disclosure, seconds are used as the unit.

(2) Standardize the Size of the File.

Similar to the life cycle, the file size also has a change range from zero to infinity. Therefore, a log expression may also be used for standardizing a value of the size, to reduce a difference between values of sizes of different files. A standardized size $F_{normsize}$ satisfies a formula 3:

$$F_{normsize} = \log(F_{realsize}) \qquad \text{Formula 3,}$$

where $F_{realsize}$ is a size of a file before standardization. It should be noted that, a unit of the size is not limited in embodiments of this disclosure. For example, in embodiments of this disclosure, Kb is used as the unit.

(3) Encode the File Path.

Because data of the file path is in a form of a character string, to quantize the feature, vector data of the file path may be generated in an encoding manner, and is used as input data for training a file attribute prediction model. The encoding manner is not limited in embodiments of this disclosure. For example, one-hot encoding may be used, and a specific encoding manner is as follows.

The file path is unified to include a specified quantity of characters. For example, the file path may be unified to include 4096 characters. When a length of the file path does not exceed 4095 characters, a character '\0' is added at the end of the file path, to enable the length of the file path to reach the 4096 characters, where the character '\0' is also referred to as an end of file (EOF) character. When the length of the file path exceeds the 4095 characters, a directory at the beginning of the file path is deleted by directory, so that a path length of a final file does not exceed the 4095 characters. After deleting, the character '\0' is added at the end of the file path, to enable the length of the file path to reach the 4096 characters. For example, it is assumed that the file path is d:\abcde\abd, which includes only 12 characters. 4084 characters of '\0' are added at the end of the file path, to enable the length of the file path to reach the 4096 characters. It is assumed that the file path is d:\abcdea\bd\ . . . \efd, which includes 4100 characters in total, where " . . . " is an omitted path. A d:\ directory and an abcde\ directory in the file path are deleted, to enable the file path to include 4091 characters, and then five characters of '\0' are added at the end of the file path, to enable the length of the file path to reach the 4096 characters. A path of the final file is abd\ . . . \efd\0\0\0\0\0.

Binary numbers are used for identifying characters including A-Z, a-z, 0-9, and special characters: '"', '~', '!', '@', '#', '$', '%', '^', '&', '*', '(',')', '-', '_', '=', '+', '[', ']', '{', '}', '{', '}', '\', '|', ',', '.', '"', '"', ';', '<', ':', '>', '/', '?', and '\0' that may appear in the file path. For example, a 95-bit binary may be used for identifying the foregoing 95 characters. In a binary number of each character, one bit is 1, the remaining bits are 0, and in different characters, positions of bits having a value of 1 are different. In this case, in 95-bit binary numbers, the positions of the bits having the value of 1 may be used for distinguishing the 95 characters. For example, a binary number of a character A is 1000 . . . 000, a binary number of B is 0100 . . . 000, and a binary number of C is 0010 . . . 000. Therefore, for paths with a same length of 4096 bits, binary code of the path is a 95×4096 matrix, where each row of the matrix represents binary code of a character in the path.

Each column of the matrix is concatenated to generate a column vector. For example, starting from a second column of the matrix, from left to right, data of each column is concatenated below data in a last row of a left column of the column. For example, when the matrix is $$\begin{bmatrix} 1 & 3 \\ 2 & 4 \end{bmatrix},$$

a column vector $$\begin{bmatrix} 1 \\ 2 \\ 3 \\ 4 \end{bmatrix}$$

is generated after the concatenation. Similarly, after concatenation of the 95×4096 matrix in the previous step, a 1×389, 120 matrix may be obtained.

The generated column vector is used as the input data for training the file attribute prediction model.

S303: The file management apparatus 14 generates the file attribute prediction model.

The file attribute prediction model is an artificial intelligence (AI) model obtained through machine learning training. A process of training the file attribute prediction model may be implemented using a backpropagation algorithm in supervised training, and a specific process may be as follows.

(1) Build a sample set.

The attribute data of the sample file obtained in step S301 is used as the sample set, where the attribute data is processed in step S302, and the sample file may be a file that has been stored in a storage node in a file management system. Each sample in the sample set includes the vector data of the file path generated in the encoding manner, and includes the standardized life cycle value and the standardized file size. The vector data is used as the input data of the file attribute prediction model, and a predicted life cycle value and a predicted file size may be obtained through calculation of the file attribute prediction model. In addition, the standardized life cycle value and the standardized file size are used as tag values, which are used for comparing with the predicted values, to update the file attribute prediction model.

(2) Initialize the file attribute prediction model.

A network type used by the file attribute prediction model is not limited in embodiments of this disclosure. For example, a convolutional neural network (CNN) may be used, where the CNN includes three parts: a convolution layer, a pooling layer, and a fully connected layer. The convolution layer is used for extracting a local feature of the input data, and each element of a convolution kernel may be multiplied by each element of the input data for summing up. An obtained convolution result z satisfies a formula 4:

$$z(n) = \sum_{m=1}^{M} f(n-m) * h(m),$$ Formula 4 where f is the input data, h is the convolution kernel, M is a quantity of elements of the convolution kernel, and a quantity of elements in the convolution result z is a quantity of input data minus a quantity of convolution kernels plus 1.

For example, when the input data is a vector {1, 2, 3, 4, 5, 6, 7}, and the convolution kernel is {−1, 2, 1}, a calculation process of a first number in the convolution result is −1*3+2*2+1*1, a calculation result is 2, and a final convolution result is {2, 4, 6, 8, 10}.

The pooling layer is used for sampling the convolution result, and can reduce a quantity of calculation data. The fully connected layer is used for a final result, and a three-layer model may be used, where a first layer is an input layer and is used for receiving data after pooling. A second layer is a hidden layer, and includes at least one node. It should be noted that, these nodes may form a one-layer or multi-layer structure, where each layer may include one or more nodes, and a quantity of layers and a quantity of nodes at each layer are not limited in this disclosure. Each node at a first layer of the hidden layer is connected to nodes at the input layer, and a value of each node at the first layer is obtained using a weighted sum of the nodes at the input layer that are connected to the node at the first layer. Each node at each layer of an intermediate layer of the hidden layer is connected to nodes of an upper layer, and a value of each node at each layer is obtained using a weighted sum of the nodes at the upper layer that are connected to the node at each layer. Each node at a last layer of the hidden layer is further connected to nodes at an output layer, and a value of each node at the output layer is obtained using a weighted sum of the nodes at the last layer connected to the output layer. A third layer is the output layer, includes two nodes, and is used for outputting the life cycle value and the file size that are of the sample after calculation.

A value of an element of the convolution kernel and a weight of a node at the fully connected layer are used as to-be-trained parameters.

Optionally, a rectified linear unit (ReLU) may be added between the convolution layer and the pooling layer for calculation, and a ReLU function is a piecewise linear function. When x is a negative value, an output is 0, and when x is a positive value, the output remains unchanged.

Optionally, the CNN may include more or fewer convolution layers, pooling layers, and fully connected layers. Quantities and connection relationships that are of convolution layers, pooling layers, and fully connected layers are not limited in embodiments of this disclosure.

(3) Set an initial parameter value of a to-be-trained parameter in the file attribute prediction model, where the initial parameter value is not limited in this disclosure.

(4) Use vector data of a file path of a sample in the sample set as input of the file attribute prediction model, to calculate a life cycle value and a file size that are of the sample and that are output after the file attribute prediction model is used.

(5) Use a gradient descent method, to reversely update a value of each parameter from a node at the last layer based on an error.

(6) Use an updated parameter value to return to perform step (4) and step (5) until an obtained error value is less than a first threshold. The first threshold has to be less than a smallest value of errors between life cycle values of all samples in the sample set and sample tags respectively and errors between file sizes of all the samples in the sample set and sample tags respectively.

(7) Repeat steps (4), (5), and (6) until all the samples in the sample set are subject to the foregoing process, in other words, a final file attribute prediction model is obtained.

The trained file attribute prediction model may be stored in the file management apparatus 14 in FIG. 1.

According to the foregoing operation process, the training phase of the file management method can be completed, to obtain the file attribute prediction model. Subsequently, a life cycle value or a file size of the newly created file can be obtained based on the file attribute prediction model, and storage is performed based on a set storage policy. The process may also be referred to as the storage phase. It should be noted that, in a process of performing the file management method, the training phase needs to be performed only once, the storage phase may be performed each time a file is newly created, and the same file attribute prediction model may be used each time. The storage phase includes the following steps.

S304: The file management apparatus 14 obtains a storage path of the newly created file.

A user may create the new file through a client 11, and specify the storage path of the file. After obtaining the storage path of the newly created file from the client, the file management apparatus 14 encodes the path in an encoding method similar to that in S302.

S305: The file management apparatus 14 obtains the file size of the newly created file.

The file management apparatus 14 inputs the storage path of the newly created file into the trained file attribute prediction model, to obtain a predicted file size. Further, according to the standardization manner in S302, the file management system uses an inverse function for calculation to obtain a predicted value of a final file size of the newly created file.

S306: The file management apparatus 14 determines the data layout of the file based on the predicted value of the file size.

The file size may be divided into a plurality of consecutive intervals, where a small quantity of strips is used for storage for an interval in which the file size is less than or equal to a second threshold, and a large quantity of strips is used for storage for an interval in which the file size is greater than or equal to a third threshold. Specific values of the second threshold and the third threshold and a quantity of intervals are not limited in embodiments of this disclosure. The file management apparatus 14 performs storage by using a corresponding quantity of strips based on an interval to which the predicted value of the file size obtained in S305 belongs. For example, the file size may be divided into five intervals: [0, 1M), [1M, 256M), [256M, 1G), [1G, 265G], and (256G, +∞), where each interval corresponds to a quantity of strips shown in FIG. 4. When the file size is less than 1M, a quantity of strips for storing file data is 1. When the file size is greater than or equal to 1M and less than 256M, a quantity of strips for storing file data is 4. When the file size is greater than or equal to 256M and less than 1G, a quantity of strips for storing file data is 8. When the file size is between 1G and 256G, a quantity of strips for storing file data is 16. When the file size is greater than 256G, all strips are used for storing file data.

Figure 4:
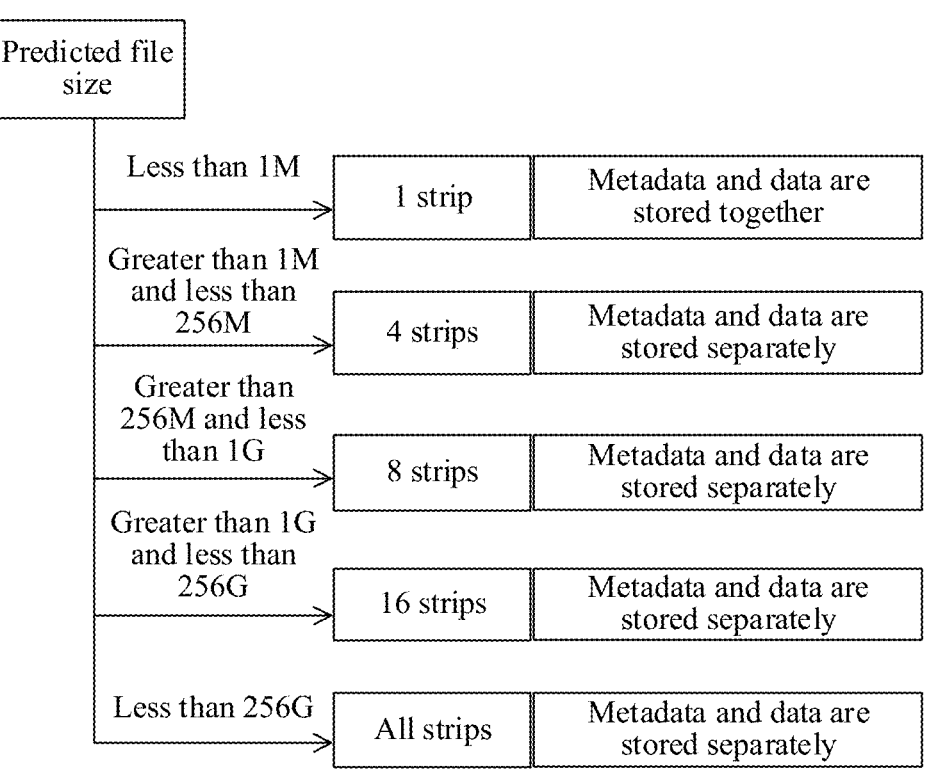
FIG. 4 is a schematic diagram of a method for determining a data layout according to this disclosure.

Optionally, when a quantity of strips for storing file data is less than a fourth threshold, the metadata and the file data are stored together, and when a quantity of strips for storing file data is greater than or equal to the fourth threshold, the metadata and the file data are stored separately. A specific value of the fourth threshold is not limited in embodiments of this disclosure. For example, as shown in FIG. 4, when the file size is less than 1M, the metadata of the file and data of the file are stored together, and when the file size is greater than 1M, the metadata of the file and the data of the file are stored separately.

S307: The client obtains a data layout manner of the newly created file.

When the file management apparatus 14 is connected to the client 11, the file management apparatus 14 may directly send the data layout manner of the newly created file to the client. The data layout manner includes a quantity of strips and a storage flag, where the storage flag indicates whether the metadata and the data that are of the file are stored together.

When the file management apparatus 14 is connected to a metadata server 120, the file management apparatus 14 may further send the data layout manner of the newly created file to the metadata server 120, and the client obtains the data layout manner of the newly created file from the metadata server 120.

When the file management apparatus 14 is connected to both the client 11 and the metadata server 120, any one of the foregoing two manners may be used.

S308: The client stores the newly created file based on the data layout manner of the file.

The client stores the newly created file in an object storage target based on the data layout manner of the file.

According to the foregoing file management method, the user can perceive the size of the newly created file in advance, reduce metadata access, and directly perform a storage-related operation, which improves storage performance of the file management system.

In another embodiment, the file management apparatus 14 may only predict the size of the newly created file, and the client 11 determines the data layout manner of the newly created file. A difference from the file management method shown in FIG. 3 is that, in S306, the file management apparatus 14 sends the obtained predicted file size to the client 11, and the client 11 determines the data layout manner of the newly created file according to the method in S306. Correspondingly, S307 may not be performed, and other steps are similar to the file management method shown in FIG. 3. According to this manner, the file management apparatus 14 may be deployed on the cloud, a high computing capability of a cloud device is used for training the file attribute prediction model, to obtain the predicted file size, and simple calculation of obtaining the data layout of the file based on the predicted file size can be completed by a local client, which improves performance of the file management system.

In another embodiment, the data layout of the newly created file may alternatively be determined by the metadata manager 120. A difference from the file management method shown in FIG. 3 is that, in S306, the file management apparatus 14 sends the obtained predicted file size to the metadata manager 120, and the metadata manager 120 determines the data layout manner of the newly created file according to the method in S306. Accordingly, in S307, the client 11 obtains the data layout of the newly created file from the metadata manager 120.

Figure 5:
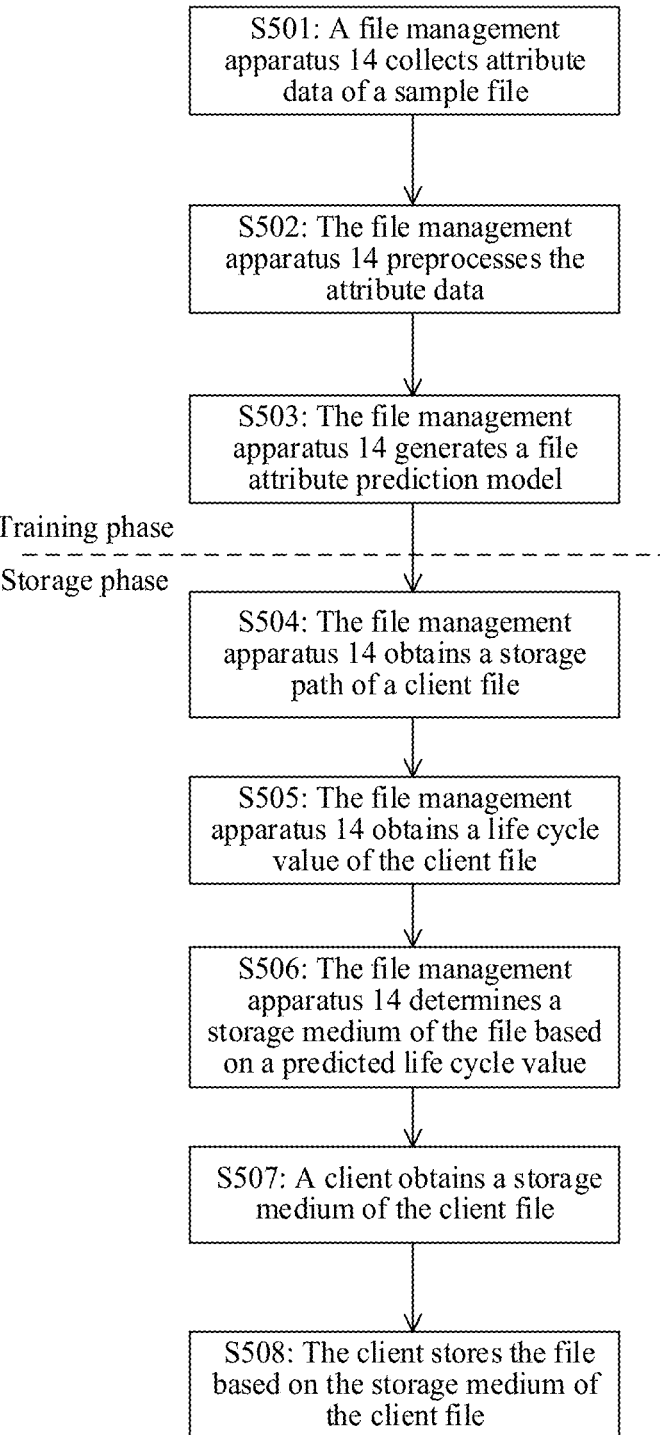
FIG. 5 is a schematic flowchart of another file management method according to this disclosure.

FIG. 5 is a schematic flowchart of another file management method according to this disclosure. The method may be used for determining a storage medium of a file stored by a client. The method includes two phases: a training phase and a storage phase. As shown in the figure, steps S501 to S503 in the training phase may use a method similar to that in S301 to S303, to obtain a file attribute prediction model, and store the file attribute prediction model in a file management apparatus 14. A specific method of the storage phase includes the following steps.

S504: The file management apparatus 14 obtains a storage path of a client file.

The client file includes a file that is being used by the client after being read by the client from an object storage target and a file that is still stored in a memory of the client after use. After obtaining the storage path of the client file from the client, the file management apparatus 14 encodes the path in an encoding method similar to that in S302.

S505: The file management apparatus 14 obtains a life cycle value of the client file.

The file management apparatus 14 inputs the storage path of the client file into a trained file attribute prediction model, to obtain a predicted life cycle value. Further, according to the standardization manner in S302, a file management system uses an inverse function for calculation to obtain a predicted value of a final life cycle of the client file.

S506: The file management apparatus 14 determines a storage medium of the file based on the predicted life cycle value.

As described above, the client includes a plurality of memories having different storage media, including a DRAM, an SSD, and an HDD, and the memories having the different storage media have different data read/write speeds. The file management apparatus 14 may obtain the storage medium of the client file stored in the client. Particularly, when the client file is being used, the client file is stored in the DRAM of the client. The file management apparatus 14 monitors existence duration of the client file in a current storage medium. When the existence duration exceeds a first duration threshold, the file management apparatus 14 sets the storage medium of the file to a storage medium whose read speed is slower than that of the current storage medium. The first duration threshold T may satisfy a formula 5:

$$T=(1+\Delta)\times F \qquad \text{Formula 5,}$$

where in the formula, F is the predicted life cycle value, $\Delta$ is used for elastically setting the predicted life cycle value, and a value of $\Delta$ is not limited in embodiments of this disclosure.

For example, $\Delta$ may be an average error rate of differences between tag values of life cycles of samples and predicted life cycle values respectively in the training steps of the file attribute prediction model in S303.

Figure 6:
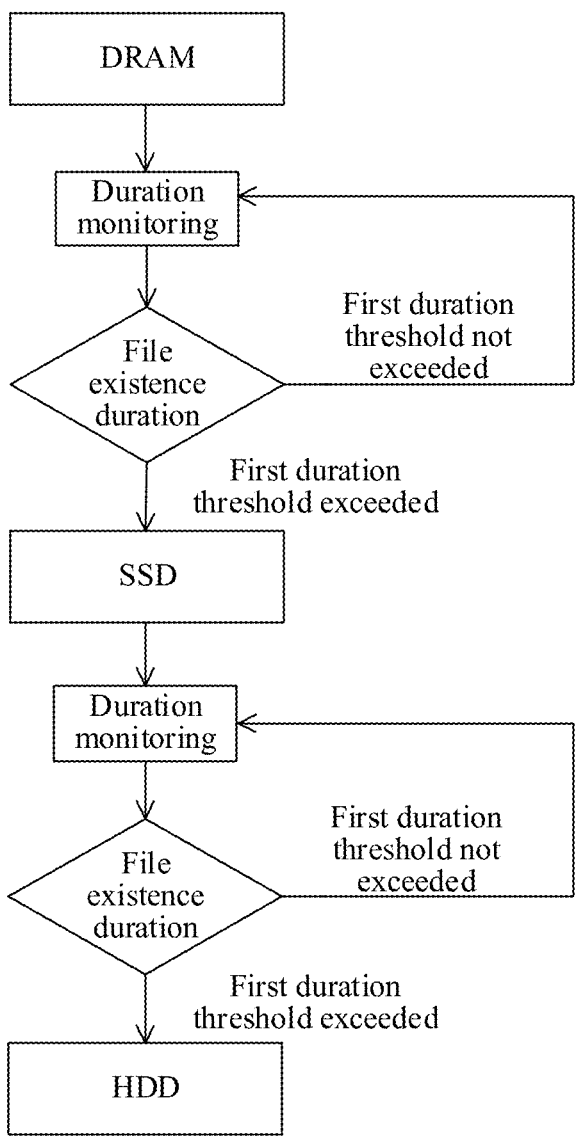
FIG. 6 is a schematic diagram of a method for determining a storage medium according to an embodiment of this disclosure.

FIG. 6 is a schematic diagram of a method for determining a storage medium according to an embodiment of this disclosure. As shown in FIG. 6, a DRAM, an SSD, and an HDD are used as examples, a data read/write speed of the DRAM is greater than that of the SSD, and a data read/write speed of the SSD is greater than that of the HDD. For a file stored in the DRAM, when existence duration of the file is not greater than a first duration threshold, a storage medium of the file continues to be set to the DRAM, and when the existence duration of the file is greater than the first duration threshold, the storage medium of the file is set to the SSD. For a file stored in the SSD, when existence duration of the file is not greater than the first duration threshold, a storage medium of the file continues to be set to the SSD, and when the existence duration of the file is greater than the first duration threshold, the storage medium of the file is set to the HDD.

S507: The client obtains a type of the storage medium of the client file.

The file management apparatus 14 sends the type of the storage medium of the client file to the client.

S508: The client stores the file based on the storage medium of the client file.

The client stores, based on the storage medium of the client file, the file in a memory corresponding to the storage medium.

According to the foregoing file management method, a user can perceive the life cycle value of the client file in advance, monitor storage duration of the file, and remove a file whose storage duration exceeds a life cycle from a storage medium with a high read/write speed, to release space of the storage medium with the high read/write speed, which improves storage performance of the file management system.

In another embodiment, the file management apparatus 14 may only predict the life cycle value of the client file, and the client 11 determines the storage medium of the client file. A difference from the file management method shown in FIG. 5 is that, in S506, the file management apparatus 14 sends the obtained predicted life cycle value to the client 11, and the client 11 determines the storage medium of the client file according to the method shown in FIG. 6. Correspondingly, S507 may not be performed, and other steps are similar to the file management method shown in FIG. 5. According to this manner, the file management apparatus 14 may be deployed on the cloud, a high computing capability of a cloud device is used for training the file attribute prediction model, to obtain the predicted life cycle value, and monitoring storage duration of the client file can be completed by a local client. This reduces time for uploading data to the cloud.

It should be noted that, for ease of description, the foregoing method embodiments are described as a series of action combinations. However, a person skilled in the art should learn that this disclosure is not limited to the described sequence of the actions.

Another reasonable step combination that can be figured out by a person skilled in the art based on the content described above also falls within the protection scope of this disclosure. In addition, a person skilled in the art should further learn that all embodiments described in this specification are embodiments, and the related actions are not necessarily mandatory to this disclosure.

Figure 7:
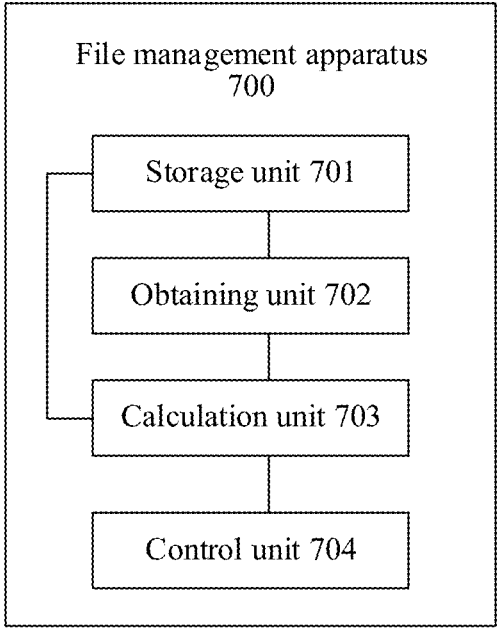
FIG. 7 is a schematic diagram of a file management apparatus according to an embodiment of this disclosure.

With reference to FIG. 2 to FIG. 6, the foregoing describes in detail the file management method according to embodiments of this disclosure. With reference to FIG. 7, the following further describes the file management apparatus 14 according to embodiments of this disclosure.

FIG. 7 is a schematic diagram of a file management apparatus 700 according to an embodiment of this disclosure. The file management apparatus 700 includes a storage unit 701, an obtaining unit 702, a calculation unit 703, and a control unit 704. The apparatus 700 may correspondingly perform the method described in FIG. 3 or FIG. 5.

The storage unit 701 is configured to store an attribute prediction model.

The obtaining unit 702 is configured to obtain a storage path of a file. For specific implementation, refer to step S304 in FIG. 3 or step S504 in FIG. 5. Details are not described herein again.

The calculation unit 703 is configured to obtain an attribute of the file through calculation based on the storage path and the attribute prediction model. For specific implementation, refer to step S305 in FIG. 3 or step S505 in FIG. 5. Details are not described herein again.

The control unit 704 is configured to determine a storage policy for the file based on the attribute. For specific implementation, refer to step S306 in FIG. 3 or step S506 in FIG. 5. Details are not described herein again.

It should be understood that the file management apparatus 700 in this embodiment of this disclosure may be implemented through an application-specific integrated circuit (ASIC), or may be implemented through a programmable logic device (PLD), where the foregoing PLD may be a complex PLD (CPLD), a field-programmable gate array (FPGA), generic array logic (GAL), or any combination thereof. Alternatively, when the model recommendation method shown in FIG. 3 is implemented using software, the file management apparatus 700 and each module of the file management apparatus 700 may alternatively be software modules. In this case, the file management apparatus 700 may be executed by the client 11 shown in FIG. 1 or another device, or may be executed by an independent device, for example, the file management apparatus 14 shown in FIG. 1.

Optionally, before obtaining an attribute of the file through calculation, the obtaining unit 702 may further obtain attribute data and a file path that are of a stored file. The calculation unit 703 is further configured to determine the storage policy for the file based on the attribute. For specific implementation, refer to steps S301 to S303 in FIG. 3 or steps S501 to S503 in FIG. 5. Details are not described herein again.

Optionally, the control unit 704 is further configured to obtain a first storage medium in which the file is currently stored and storage duration of the file in the first storage medium. When the storage duration does not exceed a first duration threshold, the first storage medium is still used for storage. When the storage duration exceeds the first duration threshold, a second storage medium is used for storage, and a read speed of the second storage medium is less than a read speed of the first storage medium. For specific implementation, refer to step S506 in FIG. 5. Details are not described herein again.

In conclusion, the file management apparatus 700 provided in this embodiment of this disclosure may use the storage path of the file to predict the attribute of the file, and obtain the storage policy for the file. This reduces a quantity of accesses to metadata of the file, and improves a speed of storing and reading the file.

Figure 8:
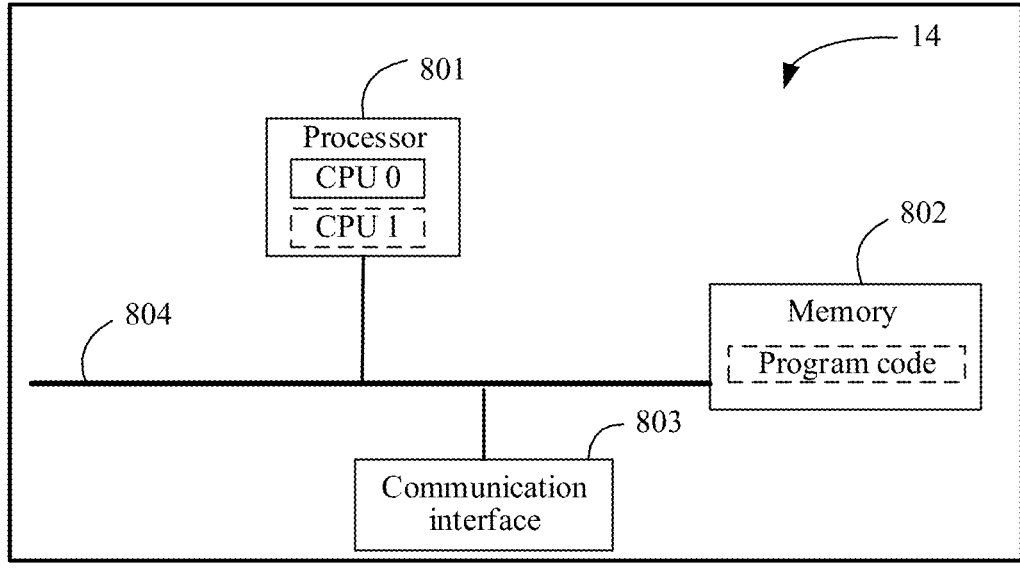
FIG. 8 is a schematic diagram of a device according to an embodiment of this disclosure.

FIG. 8 is a schematic diagram of a device 800 according to an embodiment of this disclosure. As shown in the figure, the device 800 includes a processor 801, a memory 802, a communication interface 803, and a bus 804. The processor 801, the memory 802, and the communication interface 803 communicate through the bus 804, or may communicate in another manner such as wireless transmission. The memory 802 is configured to store computer-executable instructions and an attribute prediction model, and the processor 801 is configured to execute the computer-executable instructions stored in the memory 802 to implement the following operation steps: obtaining a storage path of a file, obtaining an attribute of the file through calculation based on the storage path and an attribute prediction model, and determining a storage policy for the file based on the attribute.

It should be understood that, in embodiments of this disclosure, the processor 801 may be a central processing unit (CPU), and the processor 801 may alternatively be another general-purpose processor, a digital signal processor (DSP), an ASIC, an FPGA or another programmable logic device, a discrete gate or transistor logic device, a discrete hardware component, or the like. The general-purpose processor may be a microprocessor, any conventional processor, or the like.

The memory 802 may include a ROM and a RAM, and provide instructions and data to the processor 801. The memory 802 may further include a non-volatile RAM. For example, the memory 802 may further store information of a device type.

The memory 802 may be a volatile memory or a non-volatile memory, or may include both the volatile memory and the non-volatile memory. The non-volatile memory may be a ROM, a PROM, an EPROM, an electrically EPROM (EEPROM), or a flash memory. The volatile memory may be a RAM, and is used as an external cache. Through example but not limitative description, many forms of RAMs may be used, for example, a SRAM, a DRAM, a synchronous DRAM (SDRAM), a double data rate (DDR) SDRAM, an enhanced SDRAM (ESDRAM), a synchlink DRAM (SLDRAM), and a direct rambus (DR) RAM.

In addition to a data bus, the bus 804 may further include a power supply bus, a control bus, a status signal bus, and the like. However, for clear description, various buses in the figure are denoted as the bus 804.

It should be understood that the file management apparatus 800 according to this embodiment of this disclosure may correspond to a corresponding body performing the method shown in FIG. 3 according to embodiments of this disclosure. In addition, the foregoing and other operations and/or functions of the modules in the file management apparatus 800 are respectively used for implementing corresponding procedures of various methods in the figures. For brevity, details are not described herein again.

In conclusion, the file management apparatus 800 provided in this embodiment of this disclosure may correspond to the file management apparatus 700 in embodiments of this disclosure. In addition, the file management apparatus may be used to manage a storage manner of a file, and a tiered storage policy and a data layout policy that are of the file are performed by predicting two attributes: a life cycle of the file and a file size. In this way, metadata query frequency is reduced and a file management speed is improved.

This disclosure further provides a file management system, where the system includes a file management apparatus and a client. The file management apparatus and the client are respectively configured to implement the operation steps of the method performed by the corresponding body in the foregoing file management apparatus. The file management apparatus may be deployed on the client or another device, or may be an independent device.

A part or all of the foregoing embodiments may be implemented by software, hardware, firmware, or any combination thereof. When the software is used for implementation, the part or all of the foregoing embodiments may be implemented in a form of a computer program product. The computer program product includes one or more computer instructions. When the computer program instructions are loaded or executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that includes one or more usable medium sets. The usable medium may be a magnetic medium (for example, a floppy disk, a hard disk, or a magnetic tape), an optical medium (for example, a DIGITAL VERSATILE DISC (DVD)), or a semiconductor medium. The semiconductor medium may be an SSD.

The foregoing descriptions are merely specific implementations of this disclosure. Any variation or replacement readily figured out by a person skilled in the art based on the specific implementations provided in this disclosure shall fall within the protection scope of this disclosure.

What is claimed is:

1. A method implemented by a storage system, comprising:
obtaining, from a client, a first storage path of a file to be stored;
obtaining attribute data and a second storage path that are of a stored file;
training, using the attribute data and the second storage path, an initial model to obtain a trained attribute prediction model;
predicting an attribute of the file through calculation based on the first storage path and the trained attribute prediction model, wherein the attribute indicates a life cycle value of the file or a size of the file; and
determining a storage policy for the file based on the attribute.

2. The method of claim 1, wherein the attribute prediction model is based on a convolutional neural network (CNN).

3. The method of claim 1, wherein the file is a newly created file, wherein the attribute is the size of the file, and wherein the storage policy is a quantity of strips used when storing data of the file.

4. The method of claim 1, wherein the file is a client file, wherein the attribute is the life cycle value of the file, and wherein determining the storage policy comprises determining a first storage medium used when storing data of the file.

5. The method of claim 4, wherein determining the first storage medium comprises:
obtaining a second storage medium in which the file is currently stored;
obtaining a storage duration of the file in the second storage medium;
identifying that the storage duration has not exceeded a duration threshold; and
determining, in response to identifying that the storage duration has not exceeded the duration threshold, that the first storage medium is the second storage medium.

6. The method of claim 4, further comprising:
obtaining a second storage medium in which the file is currently stored;
obtaining a storage duration of the file in the second storage medium;
identifying that the storage duration has exceeded a duration threshold; and
determining, in response to identifying that the storage duration has exceeded the duration threshold, that the first storage medium is a third storage medium, wherein a first read speed of the third storage medium is less than a second read speed of the second storage medium.

7. A device comprising:
a memory configured to store an attribute prediction model and computer-executable instructions; and
a processor coupled to the memory and configured to execute the computer-executable instructions to cause the device to:
obtain, from a client, a first storage path of a file;
obtain attribute data and a second storage path that are of a stored file;
train, using the attribute data and the second storage path, an initial model to obtain a trained attribute prediction model;
predict an attribute of the file through calculation based on the first storage path and the trained attribute prediction model, wherein the attribute indicates a life cycle value of the file or a size of the file; and
determine a storage policy for the file based on the attribute.

8. The device of claim 7, wherein the attribute prediction model is based on a convolutional neural network (CNN).

9. The device of claim 7, wherein the file is a newly created file, wherein the attribute is the size of the file, and wherein the storage policy is a quantity of strips used when storing data of the file.

10. The device of claim 7, wherein the file is a client file, wherein the attribute is the life cycle value of the file, and wherein the processor is further configured to execute the computer-executable instructions to cause the device to determine a first storage medium used when storing data of the file.

11. The device of claim 10, wherein the processor is further configured to execute the computer-executable instructions to cause the device to:
obtain a second storage medium in which the file is currently stored;
obtain a storage duration of the file in the second storage medium;
identify that the storage duration has not exceeded a duration threshold; and
determine, in response to identifying that the storage duration has not exceeded the duration threshold, the first storage medium is the second storage medium.

12. The device of claim 10, wherein the processor is further configured to execute the computer-executable instructions to cause the device to:
obtain a second storage medium in which the file is currently stored;
obtain a storage duration of the file in the second storage medium;
identify that the storage duration has exceeded a duration threshold; and
determine, in response to identifying that the storage duration has exceeded the duration threshold, that the first storage medium is a third storage medium, wherein a first read speed of the third storage medium is less than a second read speed of the second storage medium.

13. A computer program product comprising computer-executable instructions that are stored on a non-transitory computer-readable storage medium and that, when executed by a processor, cause a device to:
obtain, from a client, a first storage path of a file;
obtain attribute data and a second storage path that are of a stored file;
train, using the attribute data and the second storage path, an initial model to obtain a trained attribute prediction model;
predict an attribute of the file through calculation based on the first storage path and the trained attribute prediction model, wherein the attribute indicates a life cycle value of the file or a size of the file; and determine a storage policy for the file based on the attribute.

14. The computer program product of claim 13, wherein the first storage medium comprises a dynamic random-access memory (DRAM).

15. The computer program product of claim 14, wherein the computer-executable instructions, when executed by the processor, further cause the device to:

build a sample set; and initialize the initial model to obtain the attribute prediction model.

16. The computer program product of claim 15, wherein the attribute prediction model is based on a convolutional neural network (CNN).

17. The computer program product of claim 13, wherein the file is a newly created file, wherein the attribute is the size of the file, and wherein the storage policy is a quantity of strips used when storing data of the file.

18. The computer program product of claim 13, wherein the file is a client file, wherein the attribute is the life cycle value of the file, and wherein the file management apparatus is further configured to determine a first storage medium used when storing data of the file.

19. The computer program product of claim 18, wherein the computer-executable instructions, when executed by the processor, further cause the device to:

obtain a second storage medium in which the file is currently stored;

obtain a storage duration of the file in the second storage medium;

identify that the storage duration has not exceeded a duration threshold; and determine, in response to identifying that the storage duration has not exceeded the duration threshold, the first storage medium is the second storage medium.

20. The computer program product of claim 18, wherein the computer-executable instructions, when executed by the processor, further cause the device to:

obtain a second storage medium in which the file is currently stored;

obtain a storage duration of the file in the second storage medium;

identify that the storage duration has exceeded a duration threshold; and determine, in response to identifying that the storage duration has exceeded the duration threshold, that the first storage medium is a third storage medium, wherein a first read speed of the third storage medium is less than a second read speed of the second storage medium.

* * * * *